US012561739B2

(12) United States Patent
Krishnamoorthy et al.

(10) Patent No.: US 12,561,739 B2
(45) Date of Patent: Feb. 24, 2026

(54) METHOD TO ENABLE PARALLELIZATION AND INTEGRATION OF MICROSERVICES TO A HIGHLY PERFORMANT MONOLITH STRUCTURE

(71) Applicant: Capital One Services, LLC, McLean, VA (US)

(72) Inventors: Sreekanth Krishnamoorthy, Dallas, TX (US); Vaishnavi Kakumani, McKinney, TX (US); Vishwanath Hiremath, McKinney, TX (US); Nicholas Allen, Frisco, TX (US); Andrew Baldwin, Dallas, TX (US); Dirgh Rabadia, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/200,330

(22) Filed: May 22, 2023

(65) Prior Publication Data

US 2024/0394790 A1 Nov. 28, 2024

(51) Int. Cl.
G06Q 40/03 (2023.01)
(52) U.S. Cl.
CPC .................................... G06Q 40/03 (2023.01)
(58) Field of Classification Search
None
See application file for complete search history.

(56) References Cited

U.S. PATENT DOCUMENTS

| | | | |
|---|---|---|---|
| 10,755,327 B2 | 8/2020 | Nagla et al. | |
| 11,210,687 B2 | 12/2021 | Kesiboyana et al. | |
| 2006/0069635 A1* | 3/2006 | Ram ...................... | G06Q 30/08 |
| | | | 705/37 |
| 2021/0192437 A1 | 6/2021 | Dhandapani et al. | |
| 2022/0198556 A1* | 6/2022 | Baghestani ........ | G06Q 30/0625 |

FOREIGN PATENT DOCUMENTS

WO        2022115586 A1    6/2022

OTHER PUBLICATIONS

Raj et al., "Performance and complexity comparison of service oriented architecture and microservices architecture." International Journal of Communication Networks and Distributed Systems. 2021. pp. 100-117. vol. 27, Issue 1.

* cited by examiner

*Primary Examiner* — Joseph W. King
(74) *Attorney, Agent, or Firm* — Sterne, Kessler, Goldstein & Fox P.L.L.C.

(57) ABSTRACT

A computer-implemented approach is described that includes receiving a multidimensional vehicle-deal request for computation of a plurality of vehicle-deals. To overcome latency and scalability issues, the approach computes the results for the multidimensional vehicle-deal request using double parallelization. Such double parallelization involves computing pre-price and post-price calculations using two asynchronous parallel threads using microservices servers. The results are output on the device of the requester, optionally in an order sorted based on most attractive results to the user.

20 Claims, 4 Drawing Sheets

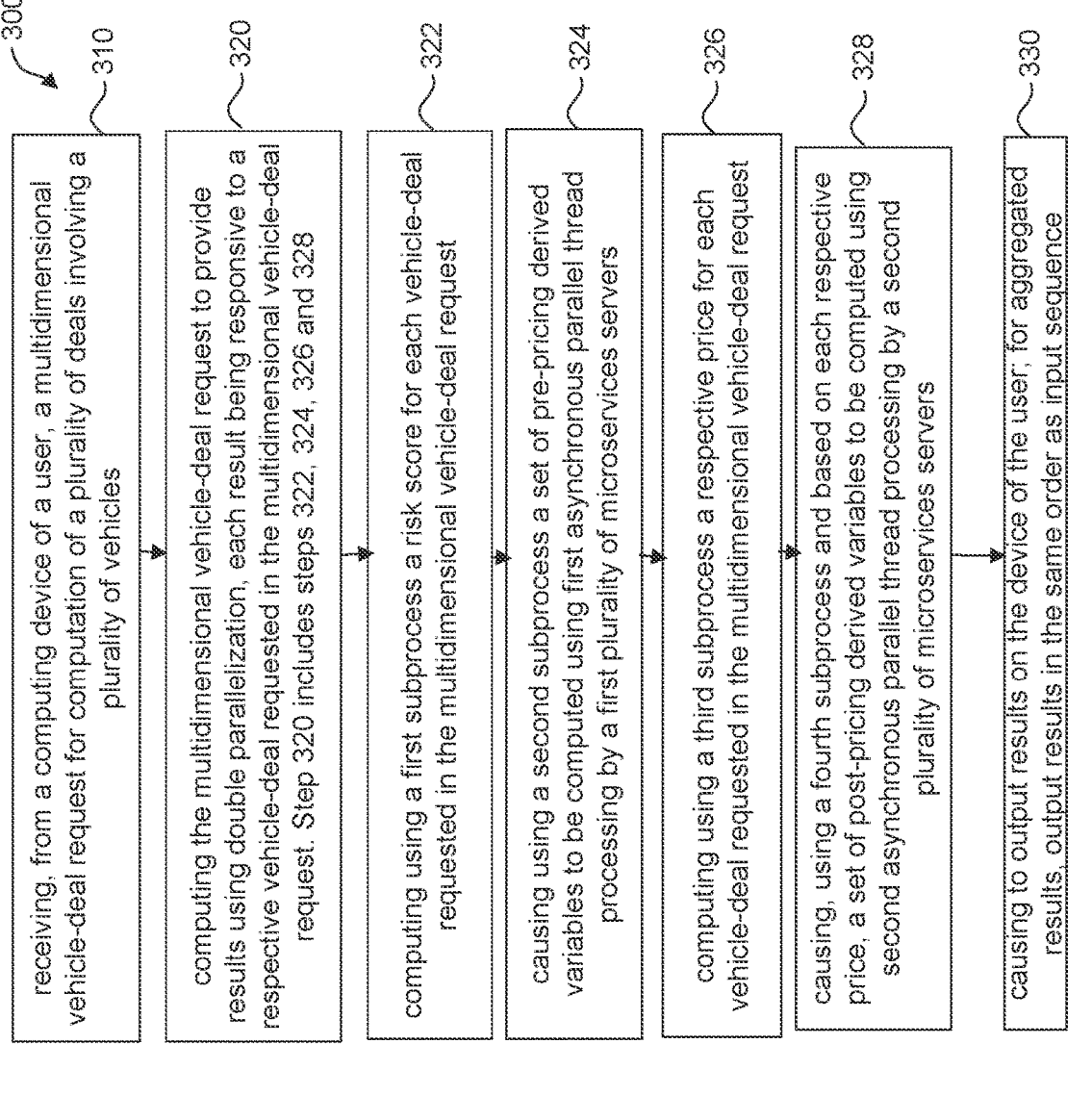

300

310 receiving, from a computing device of a user, a multidimensional vehicle-deal request for computation of a plurality of deals involving a plurality of vehicles 320 computing the multidimensional vehicle-deal request to provide results using double parallelization, each result being responsive to a respective vehicle-deal requested in the multidimensional vehicle-deal request. Step 320 includes steps 322, 324, 326 and 328

322 computing using a first subprocess a risk score for each vehicle-deal requested in the multidimensional vehicle-deal request 324 causing using a second subprocess a set of pre-pricing derived variables to be computed using first asynchronous parallel thread processing by a first plurality of microservices servers 326 computing using a third subprocess a respective price for each vehicle-deal requested in the multidimensional vehicle-deal request 328 causing, using a fourth subprocess, a set of post-pricing derived variables to be computed using second asynchronous parallel thread processing by a second plurality of microservices servers 330 causing to output results on the device of the user, for aggregated results, output results in the same order as input sequence

FIG. 3

METHOD TO ENABLE PARALLELIZATION AND INTEGRATION OF MICROSERVICES TO A HIGHLY PERFORMANT MONOLITH STRUCTURE

BACKGROUND

Computation of multidimensional deals is proving to be a technical challenge in modern computing environments. Multiple credit purchase scenarios for multiple vehicles are an example of multidimensional deals for which computation is proving to be difficult in a timely manner. A prospective purchaser of a vehicle would like to evaluate multiple purchase scenarios of various vehicles quickly using an application on their mobile device, or other computing device. However, modern computing environments are distributed and the ability to provide useful purchasing information in a timeframe commensurate with the expectations of the prospective purchaser is proving to be a challenging technological problem.

BRIEF DESCRIPTION OF THE FIGURES

The accompanying drawings, which are incorporated herein and form part of the specification, illustrate the present disclosure and, together with the description, further serve to explain the principles of the disclosure and enable a person skilled in the relevant art to make and use the disclosure.

FIG. 3 illustrates an example computer-implemented method for computing a multidimensional vehicle-deal request, according to some aspects of this disclosure.

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Overview

Figure 1:
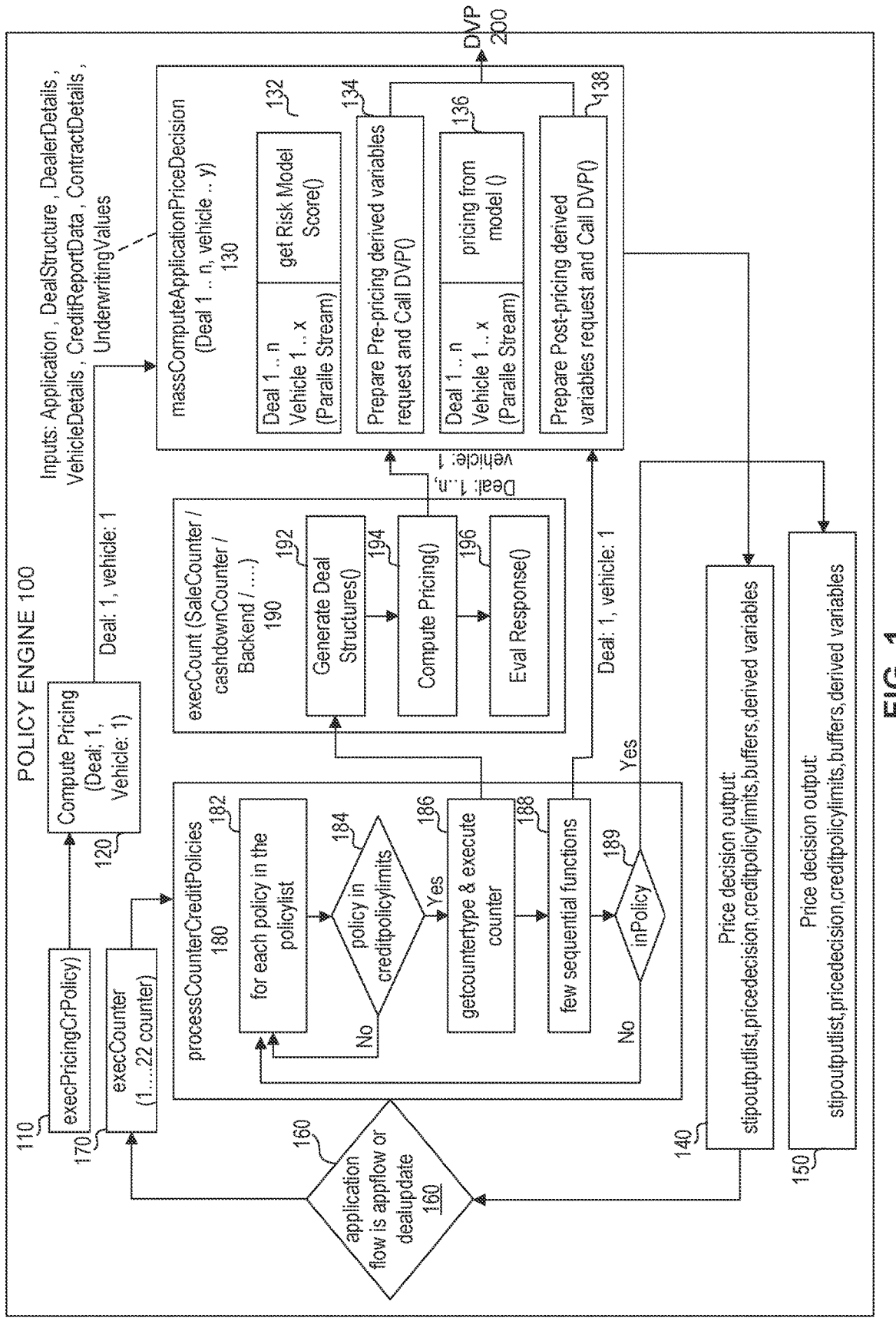
FIG. 1 illustrates various components of a policy engine including multidimensional vehicle-deal request processing, in accordance with various aspects of this disclosure.

As noted above, computation of multidimensional deals is proving to be challenge in modern computing environments. In a typical scenario, a prospective vehicle purchaser will use an application on their mobile device to determine what vehicles will be eligible for purchase by that purchaser. Vehicles under consideration are not necessarily restricted to those available at a dealership in the town where the prospective purchaser resides. Instead, vehicles may be considered that are within a reasonable travel distance from the residence of the prospective purchaser. In various scenarios, a prospective purchaser may consider vehicles that are on-sale and are located anywhere within a day's travel or within the state of residence. With the assistance of a good application on a mobile device, and in consideration that a vehicle purchase is made infrequently, a prospective purchaser may not consider the location to be particularly important, and may wish to look for certain vehicles of interest anywhere in the country. Given that the location of the vehicles under consideration is no longer as important, a large number of vehicles may be considered for purchase by the prospective purchaser.

What is important to many prospective purchasers is the ability to determine from the many vehicles within the region of interest which particular vehicles are financially acceptable to the prospective purchaser. For example, a prospective purchaser may wish to narrow down the numerous vehicle choices to those vehicles that satisfy various financial considerations (e.g., credit, price of credit such as annual percentage rate (APR)). Thus, one prospective purchaser may wish to review a list of vehicles within their state for which purchase is financially viable with one or more certain down payments, and the credit status of the purchaser supports. In such a scenario, the prospective purchaser would like to see the filtered list of vehicles that meet those financial requirements. Equally important to this scenario is that the application can determine whether each vehicle on the list will meet the requirements of the other parties involved, e.g., financial underwriting requirements, including any policies required by the underwriter or the dealers owning the vehicles. Furthermore, it is often desired that the list be placed in order of attractiveness to the prospective purchaser, e.g., best credit price such as lowest APR.

As may be surmised, the purchasing scenarios may be more complicated. For example, other considerations affecting a prospective purchaser's decision include the use of a trade-in vehicle, a dealer warranty for the vehicle, the term of the loan, and the like. From the prospective purchaser's point of view, it is desirable that all of these scenarios may be seamlessly computed in the background, and presented to the prospective purchaser on their mobile device. Importantly, it is desirable that the list of prospective vehicles (including relevant terms), which are financially viable be presented in a time frame commensurate with the attention span of the average prospective customer. Studies have shown that this time frame is approximately one second. Given that multiple prospective customers are likely wishing to examine their own set of deal scenarios, the technical challenge was immediately apparent.

With such a short time frame, and the potential for many deals to be requested, the conventional approach to computation is inadequate. The conventional approach is to use a high-powered processor, or cluster of processors, to linearly (or monolithically) process the required computations in the sequence in which they are presented. However, linear computing will not provide the results to the prospective purchaser in the required timeframe. Moreover, modern computing environments are typically no longer the high-powered processors, or cluster of processors, which dominated the computing architectures of yesteryear. Instead, distributed computing environments using microservices server, are typical of modern-day computing systems. Thus, in order to address the technical challenge of rapid presentation of the list of prospective vehicle deals to the prospective purchaser requires that the computation be presented for processing in a manner that will ensure the tight time frames may be met, despite the need to partition the work for distributed processing.

Initial attempts to partition the above computation work for processing used an approach of subdividing the work load into separate parts, which were then sent to a number of microservices servers for computation, and the results returned thereafter. However, such an approach failed as the total time for the computation, including the latency resulting from the transmission times to and from the microservices servers, meant that the desired turn-around time of, for example one second, could not be met for a reasonable number of vehicular deals requested from the prospective consumer. Nor could any straightforward use of separate threads overcome the challenge of a turn-around time of one second for a reasonable number of vehicle deals requested by the prospective consumer.

A new approach was developed to overcome these technical challenges for the deal computations described above using a microservices distributed computing approach. Such an approach addressed both technical challenges of achieving the desired turnaround time for presentation of deal results (e.g., one second) for large numbers of deals and vehicles, as well as dealing with scalability for these calculations when using distributed microservices computing resources.

Microservices are granular processes that fulfill a narrow task while remaining as technology-agnostic as possible, and thus can be performed by a wide variety of technology. Microservices are typically delivered across a network and may be deployed independently. Microservices are related only in a very loose manner, which allows for implementing and updating individual microservices, rather than entire applications or architectures. While the loose ties between processes makes for easier changes and improvements, it also creates additional challenges in terms of coordination.

The scale of the deals encompassed by aspects of this approach may be thought of as the cartesian product of deals and vehicles. Here, deals mean the requested financial parameters being contemplated by a prospective consumer for each vehicle. For example, in a given scenario, a prospective consumer may wish to request multiple financial scenarios for a given vehicle. That same prospective consumer may also wish to request multiple financial scenarios for each of a number of multiple vehicles. Thus, the scope of the technical problem being addressed includes a cartesian product from the two sets of deals and vehicles, i.e., the scope includes the set of all potential ordered combinations consisting of one deal from the set of deals and one vehicle from the set of vehicles under consideration for each prospective consumer using an application on their mobile device.

In the modern connected computational world, where relevant data is distributed across a multitude of databases in a wide variety of locations, the process by which the distributed computations take place are critical in terms of achieving the proper timeframe of those computations. These computations are typically performed by a multitude of microservices servers. However, the latency introduced by the microservices causes the large computational tasks, such as mass scoring, to be no longer performant. Such latencies result in various computations of the overall set of values to be not in order, and to negate the ability to timely provide a set of vehicle deals within the desired timeframe to a prospective consumer.

In order to meet these objectives, a variety of innovations were pioneered. In some aspects, the innovations included an aggregation of multiple parameters (e.g., vehicles and/or deals) into one request. In other aspects, the normal set of sequence of computation steps for the deal calculation are converted into parallel execution steps. As such, the computation of multiple deals/vehicles uses parallel execution, with a resulting acceleration in the computation. While the parallel execution results in computational accelerations, the resulting results will inevitably be out of order. As such, in certain aspects, it is necessary to track the original order of request so that the re-aggregation of the results may be accomplished. In some embodiments, the tracking for re-aggregation purposes may be accomplished by using an ordered list, such as using a list index.

In solving the above technical problems, the approach focused on two innovations, namely a double processing approach, together with a succinct non-duplicative data structure for the transferring data within and between computing environments.

Succinct, Non-Duplicative Data Structure

With respect to the succinct, non-duplicative data structure, the objective of the data structure to optimally transfer the data representative of information regarding the various commercial offerings to the interested consumer. The data structure devised solved a variety of additional technical challenges, including having the flexibility of description of the rich variety of the multitude of various commercial offerings of interest to the interested consumer, without duplication. In an additional technical challenge, it is desirable that the data structure be fixed during the exchange of information across the various processing capabilities in the modern processing server and services framework. By fixed, it is desired that the format data structure is unchanged, other than the additional/removal/change of data within the data structure. Furthermore, the various processing services within the distributed processing framework expect that data be typed be provided, and thus, thus data structure must be designed to provide data in typed form. In effect, this requirement invokes the need for the input processing be able to transform the input data into typed data for population of the data structure.

In addition, the data structure is required to have the flexibility to capture data whose range may extend from a single request or a multiple request. For example, an interested consumer may have an interest in a single deal involving a single vehicle. In another example, another interested consumer may be interested in looking at multiple vehicles, each with a variety of alternative proposals of an expression of interest. The multiple vehicle-multiple proposals require the data structure to efficiently describe the combinatorial problem of the multiple requests. Various examples need to address the ordered vehicle-proposal pairs that reflect the multitude of requests of interest to a particular interested consumer. In terms of efficiency, it is desirable to be able to apply the same type of parameter to multiple requests, rather than repeat the same parameter for each and every request to which it applies.

Furthermore, it is desirable that the design of the data structure avoid duplication of the values it carries. Avoiding duplication of the same value being used in multiple transactions avoids unnecessary transfer of the same values a number of times, with the benefit of increased transfer speed, reduced storage requirements, and a resulting improved overall architectural efficiency. Further information on the above data structure may be found in U.S. application Ser. No. 18/200,341 concurrently filed herewith, titled "Unique Method of Processing API Data Supporting Wide Variety of Data Types and Multiple/Singular Formats Without Data Duplication," the contents of which are incorporated herein in its entirety.

Exemplary Policy Engine

FIG. 1 illustrates a number of components of policy engine 100, in accordance with various aspects of this disclosure. Policy engine 100 facilitates the determination of a multitude of deal-vehicle requests in accordance with requests made by a prospective customer. In an embodiment of Policy Engine 100, the flow initiates a Pricing Request 110, followed by an initiation of the Pricing Computation 120. Next the massComputeApplicationPriceDecision module 130 that generates intermediate PricingDecisions 140. Intermediate PricingDecisions 140 are fed into process-CounterCreditPolicies 180 by which intermediate Pricing-Decisions 140 are reviewed against each of the relevant credit policies.

Specifically, processCounterCreditPolicies 180 include a loop 182, and a check to see if policy is in credit policy limits 184. If the deal is not within the policy 184, the loop turns to the next policy. Specifically, ProcessCounterCred-itPolicies 180 module makes the following policy evalua-tions. In step 182, a loop is executed for each policy in the policy list. In the loop, a determination is made as to whether each policy is in the credit policy limits. If the determination is that the policy is not within the credit policy limits, then the loop moves on to the next policy for evaluation. In step 186, counter-offers are generated. For example, if a deal does not have an acceptable risk profile, one or more counter offers may be generated. In certain embodiments, such a counter offer may include a reduced sale price, more cash tendered, or similar risk reduction changes. In step 188, a number of sequential functions are executed. Such sequen-tial functions include various data preparation steps to facilitate the subsequent inPolicy checks.

If the determination is that the policy is within the credit policy limits, then the next steps in the evaluation are pursued in CountModule 190. Specifically, CountModule 190 includes of steps generateDealStructures 192, which invokes ComputePricing 194, and responses are evaluated by EvalResponses 196.

In step 189, the decision "inPolicy" checks to determine whether the result is within all the relevant policies, includ-ing for example, the minimum income policy, the maximum vehicle age, minimum age. Different risk profiles are inher-ent to the different results, which is the expected result of offering various alternatives to the prospective vehicle pur-chaser. These different results need to be checked that they fall within all the relevant policies. As noted above, in step 184, it has already checked that the individual policy is within the appropriate credit policy limits. If the result is within all the relevant policies (i.e., it is "inPolicy"), a final set of price decision output is made, which constitutes a variety of results, including stipoutputlist, pricedecision, creditpolicylimits, buffers, and derived variables.

Double Parallelization Approach—Stage 1

As FIG. 1 illustrates, MassComputeApplicationPriceDe-cision 130 breaks the multidimensional pricing calculations into four separate threads. The first thread 132 is the multi-deal-vehicle computation of the risk score for each deal-vehicle combination. In an embodiment, a risk score may use various models. In the second thread 134, the pre-pricing derived variables request are prepared based on the multidimensional pricing calculations, and the request is sent off to the Derived Variables Platform 200. In the third thread 136, pricing for the multidimensional pricing calcu-lations is determined using a model for each deal-vehicle combination. In the fourth thread 138, the post-pricing derived variables requests are prepared, and the requests are sent off to the Derived Variables Platform 200. Upon completion of the four threads in MassComputeApplication-PriceDecision 130, the preliminary PriceDecisionOutput 140 is output, and routed to the CounterCreditPolicies 180.

Double Parallelization Approach—Stage 2

Figure 2:
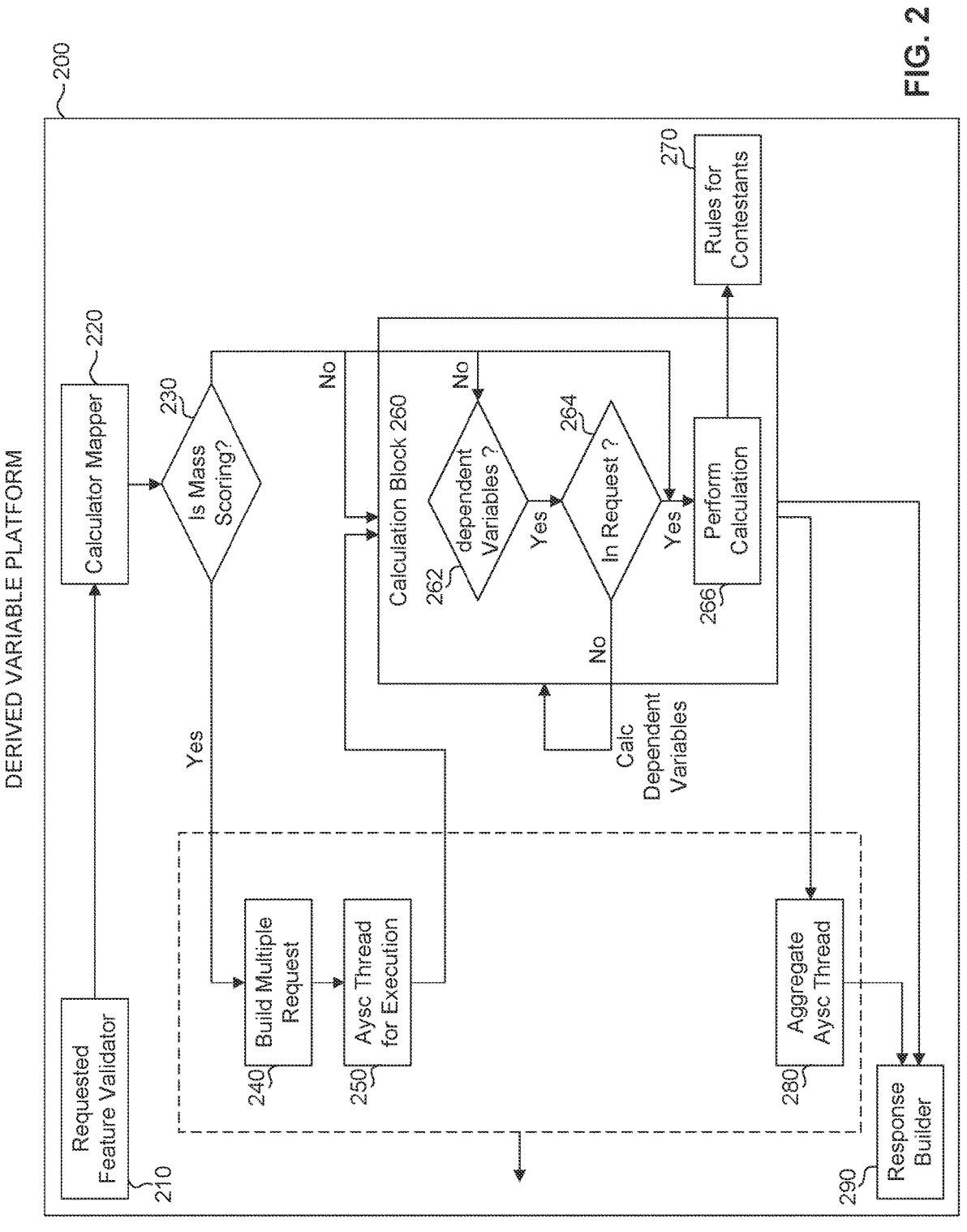
FIG. 2 is an architectural flowchart illustrating a derived variables platform for supporting multidimensional vehicle-deal request processing, according to some aspects of this disclosure.

FIG. 2 is an architectural flowchart illustrating an exem-plary Derived Variables Platform 200, according to some aspects of the invention. The data structure discussed above may be used as part of the input to Derived Variable Platform 200. The method begins with step 210, which validates the requested features. In this step, the features described in the data structure are analyzed for validity. Features may be invalid for various reasons including syntax, incorrect val-ues, in compatible fields, and the like. If any aspects of the features are invalid, several possibilities may occur. An error message may be generated, and the response builder process is terminated. Alternatively, if the error is logically correct-able, a repair (with notification) may correct the error in the feature.

In step 220, mapping occurs by a calculator mapper. For each requested feature, calculation mapper 220 identifies the relevant calculator (or function) based on the name of the requested feature. The relevant calculator then takes the appropriate inputs and provides the value of the requested feature. In step 230, it is determined whether the calculation is a mass scoring calculation. As discussed above, the term "mass scoring" means that more than one deal-vehicle is contemplated. In particular, the input data structure indicates that a plurality of computations are to be undertaken based on various permutations and combinations of the parameter values provided. If one deal-vehicle computation is desired, then the request is sent to the calculation block 260. If the request is a "mass scoring" request, as indicated by the input data structure, the method proceeds to step 240. In step 240, the building of multiple deal-vehicle requests occurs based on the permutations and combinations defined in the data structure. Thus, if the data structure indicates a full combi-nation of all members of the deal sets and vehicles set, and two possible down payments are to be applied to three possible vehicles for purchase, then a total of 6 calculation requests would be generated. Following step 240, step 250 occurs, in which the computation is packaged as one or more asynchronous threads for execution. In another embodiment, other alternative approaches to the execution of each of the multiple requests may be used, and falls within the scope of the current approach.

In step 260, calculation of each request is undertaken. Step 260 follows step 250 (packaging of the computation into one or more asynchronous threads for execution) or follows step 230, when it is it is determined that the calculation is not a mass scoring calculation. Calculation step 260 includes various substeps 262, 264 and 266. Substep 262 makes a determination of whether there are dependent variable values that are required in order for the calculation to proceed. If it is determined that the values of one or more dependent variables are required to complete the calculation, in step 264, a determination is made as to whether these values are in the received request. If these dependent variables are not available within the request itself, then these values of the dependent variables are calculated. Once the values of the dependent variables, if needed, are extracted from the Request or are calculated, the desired calculation is performed in step 266. In performing step 266, one or more rules may be retrieved as necessary, such a retrieval occurring in step 270.

Step 260 is performed by one or more microservices. Specifically, Derived Variables Platform 200 may outsource the asynchronous threads for parallel processing by micro-services servers.

Upon completion of calculation step 260 for each calcu-lation using the relevant threads, in step 280, the results from these relevant threads are aggregated in the correct order. Finally, in step 290, building of the requested response occurs using the aggregated information.

Exemplary Flowchart

FIG. 3 illustrates an example computer-implemented method 300 for performing a mass price computation request, according to some aspects of this disclosure. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps can be performed simultaneously, or in a different order than shown in FIG. 3, as will be understood by a person of ordinary skill in the art. Method 300 shall be described with regard to the architectures of FIGS. 1 and 2, and can be performed by the computer system 400 of FIG. 4. However, method 300 is not limited to the specific aspects depicted in those figures and other systems can be used to perform the method as will be understood by those skilled in the art.

In 310, the method includes receiving, from a computing device of a user, a multidimensional vehicle-deal request for computation of a plurality of deals involving a plurality of vehicles.

In 320, the method includes computing the multidimensional vehicle-deal request to provide results using double parallelization, each result being responsive to a respective vehicle-deal requested in the multidimensional vehicle-deal request. Step 320 includes steps 322, 324, 326 and 328.

In 322, the method includes computing using a first subprocess a risk score for each vehicle-deal requested in the multidimensional vehicle-deal request.

In 324, the method includes causing using a second subprocess a set of pre-pricing derived variables to be computed using first asynchronous parallel thread processing by a first plurality of microservices servers.

In 326, the method includes computing using a third subprocess a respective price for each vehicle-deal requested in the multidimensional vehicle-deal request.

In 328, the method includes causing, using a fourth subprocess and based on each respective price, a set of post-pricing derived variables to be computed using second asynchronous parallel thread processing by a second plurality of microservices servers.

In step 330, the method includes causing to output the results on the device of the user. In this step, it is further noted that for aggregated results, such results are output in the same order as the sequence of inputs provided in support of those results. Aggregated results occur when a list of requests are sought to be calculated. It is desirable that the outputs from the list of requests be provided in the same order as the input sequence.

The computing system 400 may receive a mass price computation request for a plurality of deals involving a plurality of vehicles via at least one of a user interface, a merchant webpage, or an application programming interface (API). Each mass price computation request may include respective user information. The respective user information may include data elements associated with the transaction request. For example, for each request within the mass price computation request, the data elements may include policy information, dealer information, credit information and financial calculation values.

In method 300, the computing system 400 may, for each request of the plurality of mass price computation request, determine or use microservices. The computing system 400 may determine or use the microservices based on the data elements associated with the mass price computation requests. Each microservice of the used microservices may be tasked to verify a respective data element of the data elements. For each request of the plurality of mass price computation request, the computing system 400 may determine the respective microservices by determining a type for each of the data elements, and determining that each microservice of the respective microservices is associated with at least one type of the types of the data elements.

In method 300, the computing system 400 may, for each request of the plurality of mass price computation request, send a part or all of the request to one or more microservices. For example, each microservice may be configured to communicate with an internal and/or third-party service to perform a part of, or all of, one or more requests. According to some aspects, a microservice may communicate with computing system 400 via networks including local area networks, the Internet, and the like.

Exemplary Computer Implementation

Figure 4:
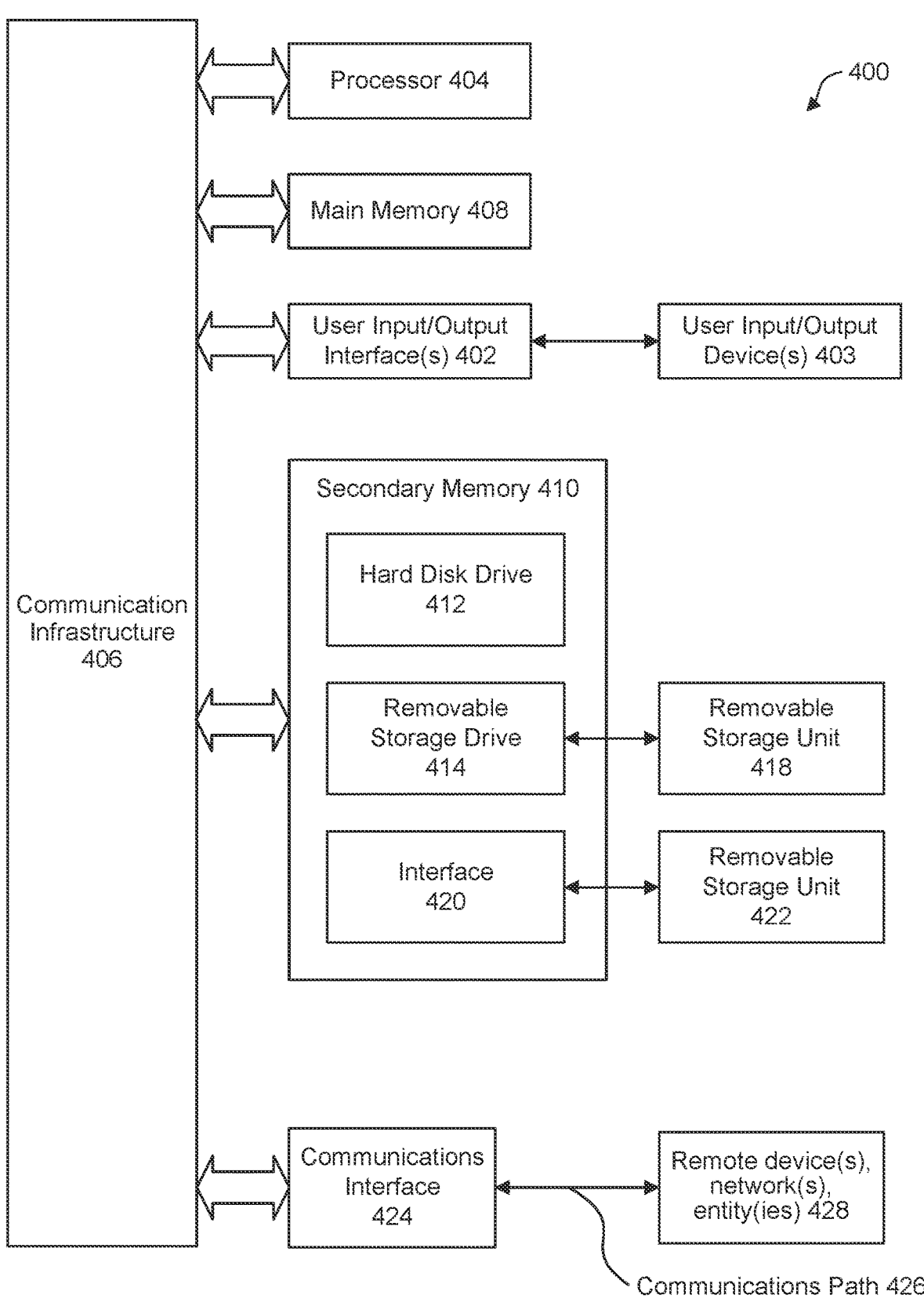
FIG. 4 is an example computer system useful for implementing various aspects disclosed herein.

Various aspects of this disclosure can be implemented, for example, using one or more computer systems, such as the computer system 400 shown in FIG. 4. Computer system 400 can be used, for example, to implement any method (e.g., method 300, etc.) described herein. Computer system 400 can be any computer capable of performing the functions described herein.

Computer system 400 can be any well-known computer capable of performing the functions described herein.

Computer system 400 includes one or more processors (also called central processing units, or CPUs), such as a processor 404. Processor 404 is connected to a communication infrastructure 406 (a bus, etc.).

One or more processors 404 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 can include one or more levels of cache. Main memory 408 has stored therein control logic (e.g., computer software) and/or data.

Computer system 400 can also include one or more secondary storage devices or memory 410. Secondary memory 410 can include, for example, a hard disk drive 412 and/or a removable storage device or drive 414. Removable storage drive 414 can be a floppy disk drive, a magnetic tape drive, a compact disk drive, an optical storage device, a tape backup device, and/or any other storage device/drive.

Removable storage drive 414 can interact with a removable storage unit 418. Removable storage unit 418 includes a computer-usable or readable storage device having stored thereon computer software (control logic) and/or data. The removable storage unit 418 can be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 can include other means, instrumentalities, or other approaches for allowing computer programs and/or other instructions and/or data to be accessed by computer system 400. Such means, instrumentalities, or other approaches can include, for example, a removable storage unit 422 and an interface 420. Examples of the removable storage unit 422 and the interface 420 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 can further include a communication or network interface 424. Communication interface 424 enables computer system 400 to communicate and interact with any combination of remote devices, remote networks, remote entities, etc. (individually and collectively referenced by reference number 428). For example, communication interface 424 can allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 4. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A computer-implemented distributed processing method comprising:

receiving, from a computing device of a user, a multidimensional vehicle-deal request for computation of a plurality of deals involving a plurality of vehicles;

computing the multidimensional vehicle-deal request to provide results using double parallelization, each result being responsive to a respective vehicle-deal requested in the multidimensional vehicle-deal request, wherein the computing uses distributed processing that includes using four subprocesses, the computing including:

computing using a first subprocess a risk score for each vehicle-deal requested in the multidimensional vehicle-deal request, first causing using a second subprocess a set of prepricing derived variables to be computed across a network using first asynchronous parallel thread processing by a first plurality of microservices servers, wherein the first causing includes packaging computation of the set of pre-pricing derived variables into one or more asynchronous threads for execution by the first plurality of microservices servers in the network, computing using a third subprocess a respective price for each vehicle-deal requested in the multidimensional vehicle-deal request, and second causing, using a fourth subprocess and based on each respective price, a set of post-pricing derived variables to be computed across a network using second asynchronous parallel thread processing by a second plurality of microservices servers, wherein the second causing includes packaging computation of the set of post-pricing derived variables into one or more asynchronous threads for execution by the second plurality of microservices servers in the network; and third causing to output results on the device of the user, the third causing including aggregating the results in a same order as the respective vehicle-deals requested.

2. The method of claim 1, wherein the multidimensional vehicle-deal request is a two-dimensional request, with a first dimension being a number of vehicles involved, and a second dimension being a number of deals.

3. The method of claim 1, wherein the first asynchronous parallel thread processing is performed by a first plurality of microservices servers, and the second asynchronous parallel thread processing is performed by a second plurality of microservices servers.

4. The method of claim 3, wherein the first plurality of microservices servers and the second plurality of microservices servers overlap, at least in part.

5. The method of claim 1, wherein each result includes an annualized percentage rate (APR) to the user.

6. The method of claim 1, wherein the third causing to output results includes causing to output results in a sorted order based on APR.

7. The method of claim 1, wherein the plurality of vehicles are located in a region in which the user is located.

8. The method of claim 1, wherein computing further includes credit policy compliance processing.

9. The method of claim 1, wherein computing further includes updating at least one request in the multidimensional vehicle-deal request based on credit policy compliance processing.

10. The method of claim 1, wherein the third causing to output results on the device of the user includes using an application on the device of the user.

11. An apparatus comprising:

memory configured to store a set of instructions; and at least one processor coupled to the memory, wherein the at least one processor when executing the set of instructions is configured to:

receive, from a computing device of a user, a multidimensional vehicle-deal request for computation of a plurality of deals involving a plurality of vehicles;

compute the multidimensional vehicle-deal request to provide results using double parallelization, each result being responsive to a respective vehicle-deal requested in the multidimensional vehicle-deal request, wherein the computing uses distributed processing that includes using four subprocesses, the computing including:

computing using a first subprocess a risk score for each vehicle-deal requested in the multidimensional vehicle-deal request, first causing using a second subprocess a set of pre-pricing derived variables to be computed across a network using first asynchronous parallel thread processing by a first plurality of microservices servers, wherein the first causing includes packaging computation of the set of pre-pricing derived variables into one or more asynchronous threads for execution by the first plurality of microservices servers in the network, computing using a third subprocess a respective price for each vehicle-deal requested in the multidimensional vehicle-deal request, and second causing, using a fourth subprocess and based on each respective price, a set of post-pricing derived variables to be computed across a network using second asynchronous parallel thread processing by a second plurality of microservices servers, wherein the second causing includes packaging computation of the set of post-pricing derived variables into one or more asynchronous threads for execution by the second plurality of microservices servers in the network; and third cause to output results on the device of the user, the third causing including aggregating the results in a same order as the respective vehicle-deals requested.

12. The apparatus of claim 11, wherein the multidimensional vehicle-deal request is a two-dimensional request, with a first dimension being a number of vehicles involved, and a second dimension being a number of deals.

13. The apparatus of claim 11, wherein the first asynchronous parallel thread processing is performed by a first plurality of microservices servers, and the second asynchronous parallel thread processing is performed by a second plurality of microservices servers.

14. The apparatus of claim 13, wherein the first plurality of microservices servers and the second plurality of microservices servers overlap, at least in part.

15. The apparatus of claim 11, wherein each result includes an annualized percentage rate (APR) to the user.

16. The apparatus of claim 11, wherein the third causing to output results includes causing to output results in a sorted order based on APR.

17. The apparatus of claim 11, wherein the plurality of vehicles are located in a region in which the user is located.

18. The apparatus of claim 11, wherein the at least one processor is further configured to compute further includes credit policy compliance processing.

19. The apparatus of claim 11, wherein the at least one processor is further configured to compute further includes updating at least one request in the multidimensional vehicle-deal request based on credit policy compliance processing.

20. The apparatus of claim 11, wherein the at least one processor is further configured to third cause to output results on the device of the user by using an application on the device of the user.

\* \* \* \* \*